United States Patent
Taylor et al.

(10) Patent No.: US 6,615,056 B1
(45) Date of Patent: *Sep. 2, 2003

(54) METHOD AND APPARATUS TO PROTECT FIXED WIRELESS TERMINAL FROM FOREIGN VOLTAGE AT THE TIP AND RING CONNECTION

(75) Inventors: Alvin Taylor, Bayside, NY (US); Daniel Giacopelli, Deer Park, NY (US); Fred Engelking, Northport, NY (US); Louis Schornack, Park Ridge, IL (US)

(73) Assignee: Telular Corp., Vernon Hills, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,891

(22) Filed: Oct. 1, 1999

Related U.S. Application Data

(63) Continuation-in-part of application No. 09/325,087, filed on Jun. 3, 1999.

(51) Int. Cl.[7] ............................................. H04Q 7/20
(52) U.S. Cl. ..................... 455/554; 455/74.1
(58) Field of Search ................. 455/554, 74.1; 379/557, 33

(56) References Cited

U.S. PATENT DOCUMENTS

| | | | | |
|---|---|---|---|---|
| 4,737,975 A | | 4/1988 | Shafer | 379/58 |
| 4,887,290 A | * | 12/1989 | Dop et al. | 379/33 |
| 5,333,177 A | | 7/1994 | Braitberg et al. | 379/59 |
| 5,422,935 A | | 6/1995 | Spear | 379/63 |
| 5,469,494 A | | 11/1995 | Ortiz Perez et al. | 375/27 |
| 5,526,403 A | | 6/1996 | Tam | 379/59 |
| 5,544,227 A | | 8/1996 | Blust et al. | 379/63 |
| 5,555,258 A | | 9/1996 | Snelling et al. | 370/29 |
| 5,619,684 A | | 4/1997 | Goodwin et al. | 395/500 |

* cited by examiner

*Primary Examiner*—William Trost
*Assistant Examiner*—Philip J. Sobutka
(74) *Attorney, Agent, or Firm*—Much Shelist Freed

(57) ABSTRACT

A method and apparatus for preventing harmful foreign voltage from being applied to a fixed wireless terminal. Upon the detection of a harmful voltage, the fixed wireless terminal is prevented from being connected to the tip-and-ring lines of a premises' land-line. The voltage is detected by a voltage-detector. The invention may also be used to disconnect the normally-closed connection of the fixed wireless terminal with the tip-and-ring lines of the premises' land-line upon the detection of a harmful voltage on the tip-and-ring lines.

13 Claims, 3 Drawing Sheets

Block Diagram

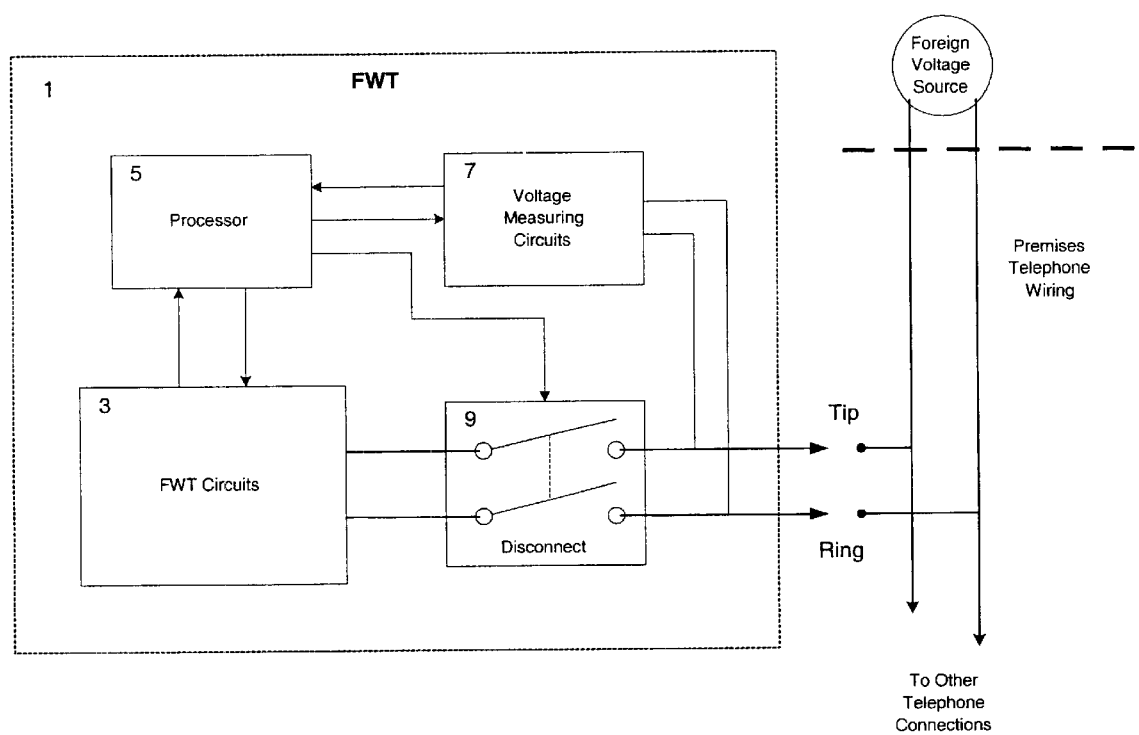
Figure 1 - Block Diagram

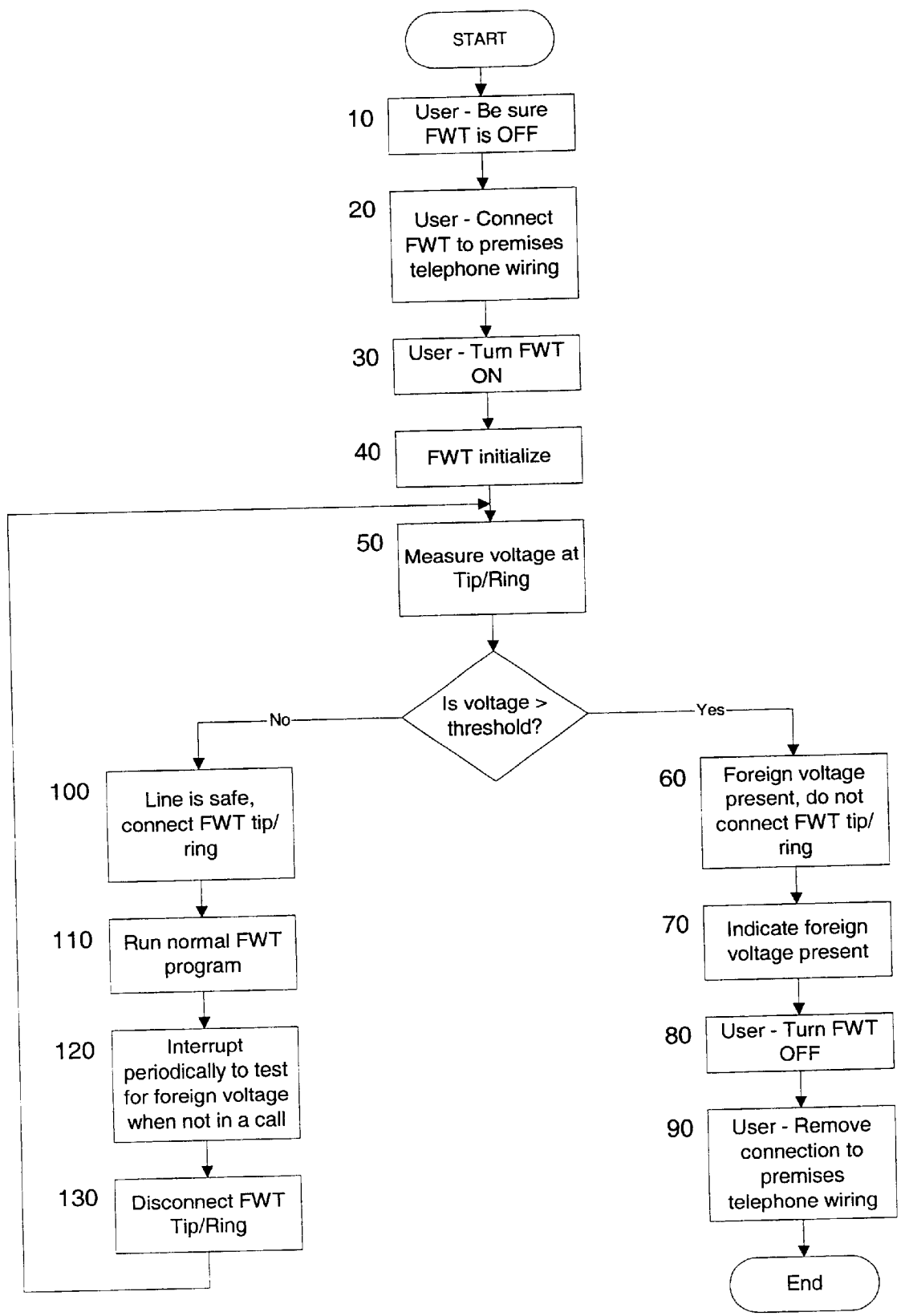
Figure 2 - Flow Chart of Process

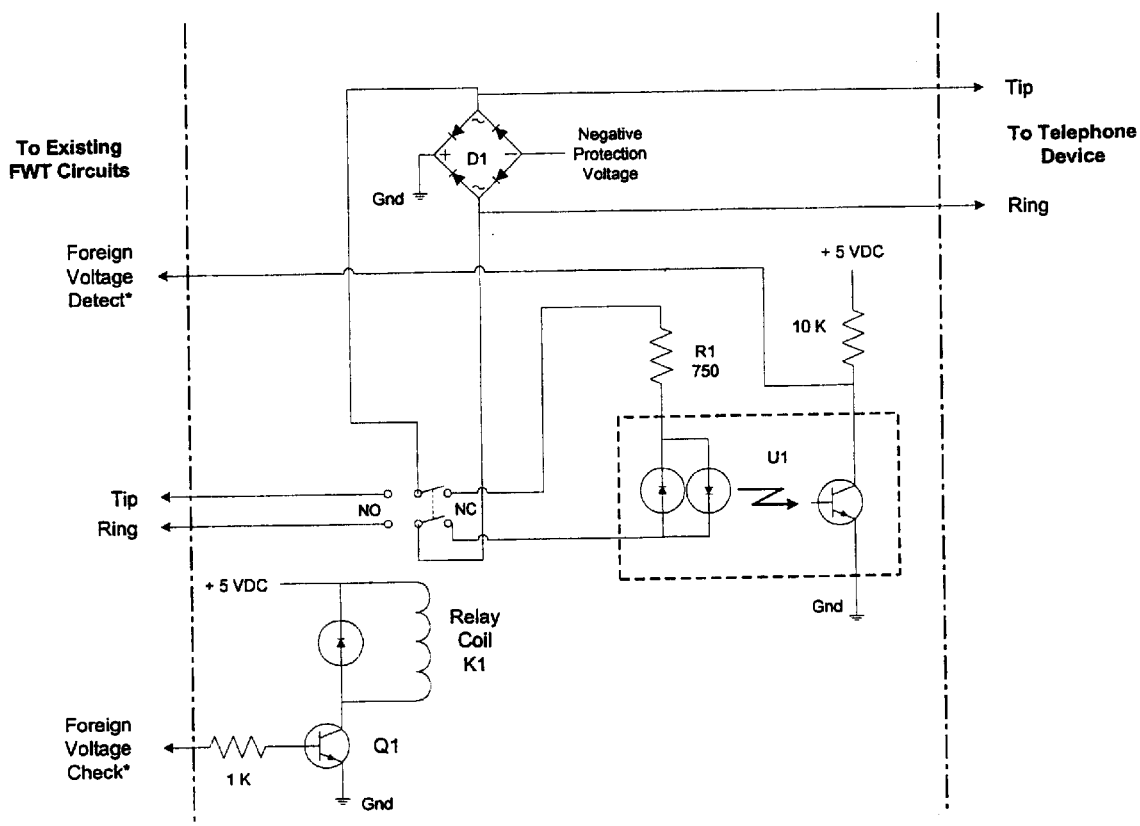
Figure 3 - Foreign Voltage Protection Circuit

METHOD AND APPARATUS TO PROTECT FIXED WIRELESS TERMINAL FROM FOREIGN VOLTAGE AT THE TIP AND RING CONNECTION

CROSS REFERENCE TO RELATED APPLICATION

The present application is a continuation-in-part of application Ser. No. 09/325,087, filed on Jun. 3, 1999.

BACKGROUND OF THE INVENTION

The present application discloses a method and apparatus to ensure that harmful voltages will not be applied to a fixed wireless terminal (FWT) when it is connected to a premises land-line telephone-wiring. The fixed wireless terminal is disclosed in commonly-owned U.S. Pat. No. 4,658,096. Any voltage present in the land-line inter-telephone wiring of the premises telephone-installation not provided by the FWT is considered foreign, and must be prevented from being applied to the FWT.

In commonly owned U.S. Pat. No. 5,812,637, there is disclosed an apparatus for using the second land-line of the PSTN for coupling a plurality of telephones to either an FWT or a first landline, whereby the second land-line of a premises wiring may be used for providing connection to the FWT. Before coupling the FWT to the second land-line, a test must be performed to ensure that harmful foreign voltages are not present, which voltages are harmful to the FWT.

A fixed wireless terminal operating on a cellular or cellular-like network or radio network, provides an alternate method of connecting the premises' (residence or business) telephone to the land-line telephone company's central office. It replaces the usual, hardwired connection from the premises to the central office (CO). In cases where the telephone installation in the premises has been hardwired, and the FWT is to replace that connection, there is danger that the wire-connection to the land-line central office is still live. The voltages present—especially when the CO tries to ring the telephone—are capable of causing significant damage to the FWT circuits. Conversely, when the FWT tries to ring the telephone by means of the premises wiring which is incorrectly still connected to the CO, the circuits at the CO may suffer damage.

In new installations, or remodeling efforts, it is also possible for workmen to accidentally connect a foreign voltage-source to the telephone wiring, such as the premises' AC voltage supply, or low voltage AC for a lawn sprinkler system, and the like.

Alternatively, it may be desirable to connect the FWT to a premises' second land-line, as disclosed in commonly owned U.S. Pat. No. 5,812,637, which discloses an apparatus for using the second land-line of the premises for coupling one or more extensions, so that each extension may use either the first line connected to the PSTN land-line or the second line connected to the FWT. Before coupling the FWT to the second land-line, a test must be performed to ensure that harmful foreign voltages are not present, which voltages are harmful to the FWT.

Current practice provides little or no protection. The wall-connection must be probed with a voltmeter or other general test equipment to ascertain the voltage, if any, present on the connector prior to connecting the FWT. Since test equipment is not normally available to the average premises' keeper, the connection is not tested and the FWT telephone connector, such as an RJ-11 jack, is simply plugged in. In the event a foreign voltage is present, the tip/ring circuits of the FWT may sustain damage.

SUMMARY OF THE INVENTION

It is the primary objective of the present invention to provide a means for the FWT to sense the voltage present on the tip/ring connection, when the FWT is connected to the premises' wiring. It, also, provides a means to disconnect the bulk of the FWT circuitry from the connection until the foreign-voltage measurement circuitry of the FWT declares the premises wiring-safe. These two means ensure a safe environment in which to establish the connection of the FWT to the premises wiring.

It is also the primary objective of the present invention to provide such a prevention means for use in directly connecting an FWT to a premises' second land-line, whereby the present invention first senses that no foreign voltages are present on that second land-line, before the FWT is connected to the tip-and-ring lines of the premises' second land-line.

BRIEF DESCRIPTION OF THE DRAWINGS

The invention will be more readily understood with reference to the accompanying drawings, wherein:

FIG. 1 is a block diagram of the fixed wireless terminal, and its connection to the premises wiring;

FIG. 2 is a flow chart of the process; and

FIG. 3 is a schematic diagram showing the foreign-voltage protection circuitry of the invention for protecting the fixed wireless terminal each time that the foreign-voltage sensing is performed.

DETAILED DESCRIPTION OF THE INVENTION

Referring to FIG. 1, the fixed wireless terminal (FWT) 1 is shown with its circuits 3 applicable to foreign voltage protection, including a microprocessor 5. The circuitry added to the basic FWT 1 consists of a voltage-sensing circuit 7, and a tip/ring disconnect means 9. The voltage-sensing circuit may be implemented many ways, but its basic function is to compare the voltage (AC and DC) on the tip/ring connection to a threshold, and send a signal to the microprocessor when the threshold is exceeded. The threshold-voltage is fixed by the voltage sensitivity of the sensor. The disconnect means may be a conventional relay or a solid state switching device. It must be capable of handling large voltages. It is normally open, so that the rest of the FWT circuits, except for the voltage-sensing circuits, are disconnected from the tip/ring connection.

Referring now to FIG. 2, the operation of the invention is described. The installer ensures that the FWT is off before connecting the FWT to the telephone wall connection (10). The connection from the FWT to the telephone wiring is made (20). The FWT is then turned on (30). The FWT will go through its initialization routine with the disconnect means held in the open condition (40). The processor will then check the voltage indication from the voltage-sensing circuit (50). If the voltage is greater than the threshold, the microprocessor will maintain the open condition on the disconnect means (60), and indicate to the installer that the telephone wiring has a foreign voltage present (70). At this indication, the installer should shut down the FWT (80), remove the FWT connection to the telephone wiring (90), and trace the origin of the foreign voltage, so it can be removed.

If the voltage is less than the threshold, the connection is considered safe (no foreign voltage present), the disconnect means will be closed (100), and the FWT will continue in its usual operation mode (110).

After initial installation, the disconnect is activated periodically, when the FWT is not in a call (such as a fraction of a second) to isolate the FWT from the telephone wiring, while the voltage measurement is made (120, 130).

The FWT circuitry is protected by a diode voltage clamp circuit during the reading by the voltage detection circuit, as can be seen in FIG. 3, which shunts any excess voltages to the power supply rails of the circuit. When the voltage-sensing circuitry is activated (50) and senses the over-voltage (60), it will keep the disconnect means open until the FWT is reset, protecting the FWT from the high voltage until the user can clear the problem.

Referring now to FIG. 3 in detail, there is shown one circuit for implementing the voltage-sensing and FWT-circuit protection above-described. Before power is applied to the FWT, the relay K1 is in a de-energized state that disconnects the existing FWT circuits from the telephone tip-and-ring lines (relay normally-open, "NO" contacts), and connects the voltage current-sensing circuit of the invention (relay normally-closed "NC" contacts). When power is first applied, the processor will maintain the aforementioned state. The current-sensing circuit consists of R1 in series with the opto-isolator U1. The current-sensing circuit connected via the NC relay contacts across the tip-and-ring lines to the telephone wiring senses any forward or reverse current flow caused by Central Office (CO) voltages, or any other foreign AC or DC voltage sources that are connected to the wiring, when one or more of these voltages are above the threshold voltage of U1 of approximately two volts. Current flow through either or both of the light emitting diodes of U1 is optically coupled to the phototransistor detector of U1 causing it to turn on. The resulting voltage drop at the junction of the phototransistor and R1 produces a Foreign Voltage Detect logic level signal to the processor. The processor maintains the disconnected state of the FWT as long as external current flows through R1 and U1. The processor also warns the user that the foreign voltage is present by flashing a warning LED on the FWT, or by any other means available. When the foreign voltage is disconnected, or if there is no foreign voltage present at the tip-and-ring, the logic signal Foreign Voltage Detect goes high, causing the processor to discontinue the warning and energize relay K1 by providing a high logic level signal Foreign Voltage Check to Q1. Relay K1 is energized connecting the tip-and-ring wiring through its NO contacts to the FWT for normal.operation. If no call is connected, the processor periodically drives the logic signal Foreign Voltage Check to a low level, causing the relay K1 to connect the tip-and-ring wiring through the NC contacts to the voltage sensing circuit, thus allowing the wiring to be periodically checked for foreign voltage.

The circuit of FIG. 3 also contains a diode bridge D1 to protect the FWT against foreign voltages which are more than one diode voltage drop above ground voltage level, or more than one diode voltage drop below the Negative Protection Voltage level.

While a specific embodiment of the invention has been shown and described, it is to be understood that numerous changes and modifications may be made therein without departing from the scope and spirit of the invention as set forth in the appended claims.

What is claimed is:

1. In an fixed wireless terminal for connecting a telephone means to a public switched telephone network, said fixed wireless terminal having a telephone-jack means for connecting a telephone means thereto, and a microprocessor for controlling the operation thereof, the improvement comprising:

means for preventing harmful land-line voltages from being connected to said fixed wireless terminal when said telephone-jack means is directly connected to premises' tip and ring lines of a public switched telephone network.

2. The fixed wireless terminal of claim 1, wherein said means for preventing comprises a prevention means controlled by said microprocessor for disconnecting the fixed wireless terminal from a land-line voltage, and voltage-detection means operatively coupled with said microprocessor.

3. The fixed wireless terminal of claim 2, wherein said prevention means comprises switch means, said switch means being normally open to disconnect the fixed wireless terminal from a harmful land-line voltage.

4. The fixed wireless terminal of claim 2, wherein said microprocessor comprises memory means, said memory means storing software for controlling said prevention means and for communication from said voltage-detection means; said voltage-detection means, upon sensing a foreign voltage on the tip-and-ring lines of a PSTN land-line providing a signal to said microprocessor, whereby said software sends a signal to said prevention means for placing said prevention means in an open, disconnect-state.

5. The fixed wireless terminal of claim 2, wherein said voltage detection means is periodically operated to check for foreign voltages on the premises' tip-and-ring lines; said microprocessor periodically sending a signal to said switch means to close said switch when said voltage detection means has been activated for sensing foreign voltages, in order to isolate the fixed wireless terminal from the premises' tip-and-ring lines.

6. The fixed wireless terminal of claim 4, wherein said voltage detection means is periodically operated to check for foreign voltages on the premises' tip-and-ring lines; said microprocessor periodically sending a signal to said switch means to open said switch means when said voltage detection means has been activated for sensing foreign voltages, in order to isolate the fixed wireless terminal from the premises' tip-and-ring lines.

7. The fixed wireless terminal of claim 5, whereby said microprocessor is operatively coupled to said voltage-detection means and said switch means, whereby upon said voltage-detection means sending a signal to said microprocessor, said microprocessor causes said switch means to open.

8. A method of preventing land-line voltages from being connected to a fixed wireless terminal, which fixed wireless terminal comprises a microprocessor, comprising:

(a) detecting the presence of a voltage on a premises' ring-and-tip lines of a PSTN;
   (b) sending a signal to the microprocessor indicating the presence of voltage on the tip-and-ring lines;
   (c) preventing the connection between the fixed wireless terminal and the tip-and-ring lines of a PSTN.

9. The method of preventing land-line voltages from being connected to a fixed wireless terminal, according to claim 8, wherein said step (c) is performed by said microprocessor.

10. The method of preventing land-line voltages from being connected to a fixed wireless terminal, according to claim 8, wherein said step (c) comprises keeping a switch in a normally-open state, whereby accidental connection of a wireless fixed terminal to premises tip-and-ring lines is prevented.

11. The method of preventing land-line voltages from being connected to a fixed wireless terminal according to claim 8, wherein said step (c) comprises opening a normally-closed switch, whereby, a fixed wireless terminal that is utilizing premises tip-and-rings lines is disconnected therefrom.

12. The method of preventing land-line voltages from being connected to a fixed wireless terminal according to claim 8, wherein said step (c) is performed when the microprocessor no longer senses a call on the fixed wireless terminal.

13. The method of preventing land-line voltages from being connected to a fixed wireless terminal according to claim 8, wherein said step (b) is performed when a threshold voltage is detected.

\* \* \* \* \*